(12) United States Patent
Hayase et al.

(10) Patent No.: US 7,209,765 B1
(45) Date of Patent: Apr. 24, 2007

(54) WIRELESS DATA COMMUNICATION SYSTEM, WIRELESS DATA COMMUNICATION METHOD AND COMMUNICATION APPARATUS

(75) Inventors: Shigenori Hayase, Kodaira (JP); Shinji Murai, Hachioji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/493,821

(22) Filed: Jul. 27, 2006

(30) Foreign Application Priority Data

Oct. 12, 2005 (JP) ............................. 2005-297624

(51) Int. Cl.
*H04Q 7/20* (2006.01)
(52) U.S. Cl. ............................. 455/550.1; 445/562.1; 445/63.1
(58) Field of Classification Search ............ 455/550.1, 455/561, 562.1, 403, 450, 101, 39, 67.11, 455/103, 63.1, 67.13; 370/334, 328, 329, 370/208, 210; 375/267, 316, 346, 347
See application file for complete search history.

(56) References Cited

U.S. PATENT DOCUMENTS

| | | | | |
|---|---|---|---|---|
| 5,886,988 | A * | 3/1999 | Yun et al. .................... | 370/329 |
| 2002/0191535 | A1* | 12/2002 | Sugiyama et al. .......... | 370/208 |
| 2004/0095907 | A1* | 5/2004 | Agee et al. .................. | 370/334 |
| 2004/0203547 | A1* | 10/2004 | Lo et al. ...................... | 455/132 |
| 2004/0252632 | A1 | 12/2004 | Bourdoux et al. | |
| 2005/0008065 | A1* | 1/2005 | Schilling .................... | 375/148 |
| 2005/0041611 | A1* | 2/2005 | Sandhu ........................ | 370/319 |
| 2005/0095996 | A1* | 5/2005 | Takano ........................ | 455/91 |
| 2005/0254457 | A1* | 11/2005 | Jung et al. .................. | 370/328 |
| 2006/0198461 | A1* | 9/2006 | Hayase ........................ | 375/267 |

OTHER PUBLICATIONS

Toshihiko Nishimura, et al., Transmitting Weight Determination by Receiving Antenna Selection for MIMO/SDMA Downlink, Institute of Electronics, Information and Communication Engineers, 2002, Book B-5-230.
Andre Bourdoux, et al., Joint TX-RX Optimisation for MIMO-SDMA, IEEE 2002, pp. 171-174.

\* cited by examiner

*Primary Examiner*—Jean Gelin
(74) *Attorney, Agent, or Firm*—Antonelli, Terry, Stout & Kraus, LLP.

(57) ABSTRACT

A wireless communication system has no limitation in the number of AP antennas and UT antennas, and determines the parallel-communication data units to be a maximum value of MIMO communication, such that it provides a MIMO-SDMA wireless data communication system having superior transmission characteristics. The MIMO-SDMA wireless data communication system includes a single AP (Access Point) and U UTs (User Terminals) communicating with the AP using the same frequency signal at the same time. The UT includes the SDMA reception (Rx) processor, and synthesizes Rx signals of antennas, such that it controls the number of Rx data units. By the control of the number of Rx data units, the communication system controls the number of parallel-communication data units to be equal to a maximum value capable of being implemented by the MIMO-SDMA wireless data communication. The AP informs the UTs of a coefficient matrix required for the SDMA Rx process, prior to transmitting actual data.

7 Claims, 8 Drawing Sheets

108: SDMA RECEPTION PROCESSOR

WIRELESS DATA COMMUNICATION SYSTEM, WIRELESS DATA COMMUNICATION METHOD AND COMMUNICATION APPARATUS

CLAIM OF PRIORITY

The present application claims priority from Japanese application JP 2005-297624 filed on Oct. 12, 2005, the content of which is hereby incorporated by reference into this application.

FIELD OF THE INVENTION

The present invention relates to a wireless data communication technique, and more particularly to a wireless data communication system based on a Space Division Multiple Access (SDMA) scheme, a wireless data communication method based on the SDMA scheme, and effective techniques associated with the system and method.

BACKGROUND OF THE INVENTION

A plurality of conventional wireless data communication technologies are as follows.

For example, many developers have conducted intensive research into a MIMO (Multiple-Input Multiple-Output) technique for increasing spectral efficiency (i.e., an amount of communication information for each unit time and each unit frequency) in a wireless communication field.

For example, there is almost no doubt that the IEEE 802.11 standard for WLAN (Wireless LAN) standardization adopts the MIMO technology in a task group (n).

Also, many developers are conducting research into a method for applying the MIMO technology to the fourth-generation mobile communication system to increase a transmission rate (also called a transfer rate).

The above-mentioned MIMO technology begins to extend/apply to the SDMA technology. The SDMA technology allows a single AP (Access Point) to simultaneously communicate with a plurality of UTs (User Terminals) using the same frequency signal.

Representative examples of the above-mentioned MIMO-SDMA technology are United States Patent Publication No. 2004-0252632A1, and a Japanese reference document entitled "Method for calculating MIMO/SDMA downlink weight using Rx antenna selection" published in The Institute of Electronics, Information and Communication Engineers Book B-5-230, filed by Nishimura Tosihiko, Takatori Yasusi, Ogane Takeo, Ogawa Yasutaka, and Osa Keizo.

SUMMARY OF THE INVENTION

The above-mentioned conventional wireless data communication technologies have the following characteristics.

Firstly, the principles of the above-mentioned conventional MIMO-SDMA technology will hereinafter be described in detail.

FIG. 1 is a block diagram illustrating the principles of the conventional MIMO-SDMA technology. Referring to FIG. 1, APs (Access Points) are located at the left side, and UTs (User Terminals) are located at the right side.

In this example of FIG. 1, a single AP communicates with U UTs (i.e., U number of UTs) using the MIMO-SDMA technology, such that data is transmitted from the AP to the UTs.

Transmission data (TxData) (1 to u) transmitted to each UT is processed by a MIMO transmission processor (MIMO TxProcess) 101 (101-1 to 101-$u$). Thereafter, data is distributed to a transmission (Tx) antenna 103 composed of M Tx antennas (103-1 to 103-M) by a SDMA transmission processor (SDMA TxProcess) 102. Output data of the Tx antenna 103 propagates through space.

The UT-i (i=1 to u) receives the output data of the Tx antenna 103 via Ni reception (Rx) antennas 104 (104-1-1 to 104-1-$N_1$, ..., 104-$u$-1 to 104-$u$-$N_u$). The MIMO reception (Rx) processor (MIMO RxProcess) 105 (105-1-1 to 105-$u$) recovers data, such that it acquires Rx data (RxData) (1 to u).

The signal transmission characteristic of space propagation between the Tx antenna 103 and the Rx antenna (104-$i$) of the UT-i may be denoted by the following transfer matrix $H_i$ as denoted by Equation 1:

$$y_i = H_i x \qquad [\text{Equation 1}]$$

where, x is a transmission (Tx) signal vector $x=(x(1), x(2), \ldots, x(M))^T$, $x(1)$ to $x(M)$ are complex amplitudes of wave signals generated from the M transmission antennas 103, $y_i$ is a reception (Rx) signal vector $y_i=(y_i(1), \ldots, y_i(N_i))^T$, and $y_i(1)$ to $y_i(N_i)$ are complex amplitudes of wave signals received in the $N_i$ Rx antennas 104-$i$.

In the SDMA technology, signals are simultaneously transmitted from the AP to a plurality of UTs, such that the Rx antennas 104 may unexpectedly receive desired signals and undesired signals at the same time, resulting in the occurrence of mixed Rx signals composed of the desired and undesired signals.

In order to solve the above-mentioned problem, the above-mentioned United States Patent Publication No. 2004-0252632A1 allows the SDMA Tx processor (SDMA TxProcess) 102 to distribute desired signals to the Tx antennas 103, and controls a plurality of wave signals generated from the Tx antennas 103 to interfere with the Rx antennas 104 operation, such that it can remove unnecessary signals from the signals received in the Rx antennas 104.

For example, the Tx data (i) from the AP to the UT-i will hereinafter be described. The Tx data (i) is unnecessary for UTs other than the UT-i, such that it is preferable that no signal arrives at the Rx antennas 104 of the UTs other than the UT-i.

For this purpose, there is a need to calculate a specific value (x) for acquiring $y_j=0$ in association with all j values (where j=any one of values other than "i").

In this case, $y_{<i>}$ and $H_{<i>}$ can be represented by the following Equation 2:

$$y_{<i>} = \begin{pmatrix} y_1 \\ M \\ y_u \end{pmatrix} \leftarrow y_i \text{ deleted}, \quad H_{<i>} = \begin{pmatrix} H_1 \\ M \\ H_u \end{pmatrix} \leftarrow H_i \text{ deleted} \qquad [\text{Equation 2}]$$

Under the above-mentioned situation, a necessary condition can be represented by the following Equation 3:

$$y_{<i>} = H_{<i>} x = 0 \qquad [\text{Equation 3}]$$

where, x is a kernel of $H_{<i>}$ in a linear algebra, and is acquired by L(i) unit vectors orthogonal to each other. In this case, the number L(i) of the unit vectors can be represented by the following Equation 4:

$$L(i) = M - \sum_{\substack{j=1 \\ j \neq i}}^{u} N_j \qquad \text{[Equation 4]}$$

The unit vectors are hereinafter referred to as SDMA control vectors, and are denoted by $A_{i,1}, \ldots, A_{i,L(i)}$.

Therefore, if the Tx data (s) is distributed to the Tx antennas 103 according to a predetermined Equation "x=sA", the signal is not applied to the Rx antennas 104 other than the UT-i. There are a plurality of SDMA control vectors, such that it is possible to perform parallel transmission of L(i) data.

The above-mentioned process is applied to Tx data toward all the UTs. If the values of signals allocated to individual Tx antennas 103 are added, and the added signals are outputted, the SDMA communication can be made available.

FIG. 2 is a detailed block diagram illustrating the SDMA transmission processor (SDMA TxProcess) 102.

Referring to FIG. 2, a multiplier 106 multiplies Tx data by the SDMA control vector, such that it distributes the multiplied Tx data to M Tx antennas 103. The signal distributed to the same Tx antenna is added by an adder 107, such that the added signal is generated from the Tx antennas 103.

Under the above situation, if the SDMA control matrix is defined by $Ai=(A_{i,1}, \ldots, A_{i,L(i)})$, a transfer matrix of the Tx data (i) from an input terminal of the SDMA transmission processor (SDMA TxProcess) 102 to the Rx antenna 104-$i$ is represented by $H_iA_i$. Based on the transfer matrix "$H_iA_i$", it is possible to control the MIMO Tx process and the MIMO Rx process between a single AP and a single UT, such that the SDMA communication from the single AP to the u number of UTs can be made available. The above-mentioned scheme is hereinafter referred to as a "null-steering" scheme.

However, the above-mentioned null-steering scheme can be made available under the condition of the following Equation 5:

$$L(i) = M - \sum_{\substack{j=1 \\ j \neq i}}^{u} N_j > 0 \; \forall \, i \qquad \text{[Equation 5]}$$

For example, if the number of AP antennas is 2 (M=2), the number of UTs is 2 (u=2), and the number of antennas is 2 ($N_1$=2 and $N_2$=2), the above-mentioned Equation 5 is not satisfied, such that it is impossible to apply the null-steering scheme to the above-mentioned Equation 5.

Then, the number of data units capable of being transmitted in parallel to the UT-i will hereinafter be described. The number of data units capable of being transmitted to the UT-i is L(i), such that the sum of the Li data units can be calculated by the following Equation 6:

$$\sum_{i=1}^{u} L(i) = uM - (u-1)\sum_{j=1}^{u} N_j \qquad \text{[Equation 6]}$$

In the meantime, provided that the MIMO-SDMA wireless data communication system is defined by MIMO communication between the AP having M antennas and the UT having $\Sigma N_i$ antennas, it can be recognized that the maximum number of data units capable of being transmitted in parallel is min(M, $\Sigma N_i$). Under this situation, the following Equation 7 can be assumed as follows:

$$M < \sum_{j=1}^{u} N_j \qquad \text{[Equation 7]}$$

In this case, the maximum number of data units capable of being transmitted in parallel is M.

In the meantime, in order to compare the M data units with the number of parallel-communication data units of the null-steering scheme, the M data units are subtracted from the number of parallel-communication data units of the null-steering scheme shown in the above Equation 6, such that the following Equation 8 can be acquired as follows:

$$\sum_{i=1}^{u} L(i) - M = (u-1)\left(M - \sum_{j=1}^{u} N_j\right) < 0 \Rightarrow \sum_{i=1}^{u} L(i) < M \qquad \text{[Equation 8]}$$

Therefore, it can be recognized that the number of parallel-communication data units of the null-steering scheme is less than the maximum value.

In other words, if the above Equation 7 is established although the above-mentioned null-steering scheme is made available by the completion of the above Equation 5 (i.e., if the number of AP antennas is less than the total number of UTs), it is impossible to maximally acquire the MIMO performance.

A representative method for acquiring the maximum number of the parallel-communication data units when the above-mentioned Equation 7 is established regardless of the situation of the above-mentioned Equation 5 has been disclosed in the above-mentioned Japanese reference document.

The above-mentioned problem occurs when many UT antennas are used. Therefore, if all the UT antennas are not used, and the antenna for use in the UT to establish Equation (M=$\Sigma N_i$) the null-steering scheme capable of providing the maximum number of parallel-communication data units can be made available. The above-mentioned operation is hereinafter referred to as an "antenna-selection null-steering" scheme.

However, the above-mentioned antenna-selection null-steering (also called "null-steering with antenna selection") scheme does not use a few antennas from among all UT antennas. As a result, although data is received in the above-mentioned unused antennas, the received data is unavoidably discarded, and power consumption encountered when the signal is received in the unused antennas is unnecessarily wasted.

Therefore, the present invention has been made in view of the above problems, and it is an object of the invention to provide a wireless data communication technique for implementing MIMO-SDMA communication even if the above Equation 5 is not satisfied, and effectively employing signals received in all Rx antennas under the situation of the above Equation 7, thereby improving a performance of the MIMO-SDMA communication.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an aspect of the present invention, the above and other objects can be accomplished by the provision of a MIMO-SDMA wireless data communication system comprising: a single AP acting as a transmitter and U UTs acting as receivers communicating with the single AP using the same frequency signal at the same time.

The AP includes a Tx antennas, and the i-th UT (i=1tou) has $N_t$ Rx antennas. The AP includes an SDMA Tx processor. The UT includes an SDMA Rx processor, and the present invention is characterized in that the UT conducts the SDMA Rx process.

In the above-mentioned configuration, the signal process of the SDMA Tx processor, transmission characteristics of space propagation signals, the signal process of the SDMA Rx processor are synthesized with each other, such that signals transmitted to the remaining receivers other than a desired receiver are suppressed.

In other words, if the condition of Equation 5 is not provided, the SDMA Rx processor of the UT synthesizes signals received in Rx antennas, controls the number of synthesized signals to be less than the number of Rx antennas, such that the number of Rx antennas seems to be less than the actual number of the same. Therefore, the MIMO-SDMA communication based on the null-steering scheme is implemented.

In accordance with another aspect of the present invention, there is provided a wireless data communication method comprising the steps of: estimating a transfer matrix of signals between the AP and the UTs by a training signal transmitted from either the AP or the UTs; determining, by the AP, the number of parallel transmission data units simultaneously applied to the UTs, and the complex coefficient of the SDMA Rx processor; determining, by the AP, the complex coefficient of the SDMA Tx processor; transmitting, by the AP, the complex coefficient of the SDMA Rx processor to the UTs, and informing the UTs of the complex coefficient of the SDMA Rx processor; outputting, by the AP, transmission (Tx) signals processed by the SDMA Tx processor; and controlling, by the UTs, signals received in Rx antennas to be signal-processed by the SDMA Rx processor, whereby the communication between the AP and the UTs is established.

The present invention is characterized in that a communication apparatus includes an SDMA Rx processor in each UT operated in the above-mentioned wireless data communication system.

The above-mentioned system and method have the following effects.

The present invention has no limitation in the number of AP antennas and UT antennas, and determines the parallel-communication data units to be a maximum value of MIMO communication, such that it provides a MIMO-SDMA wireless data communication system having superior transmission characteristics.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
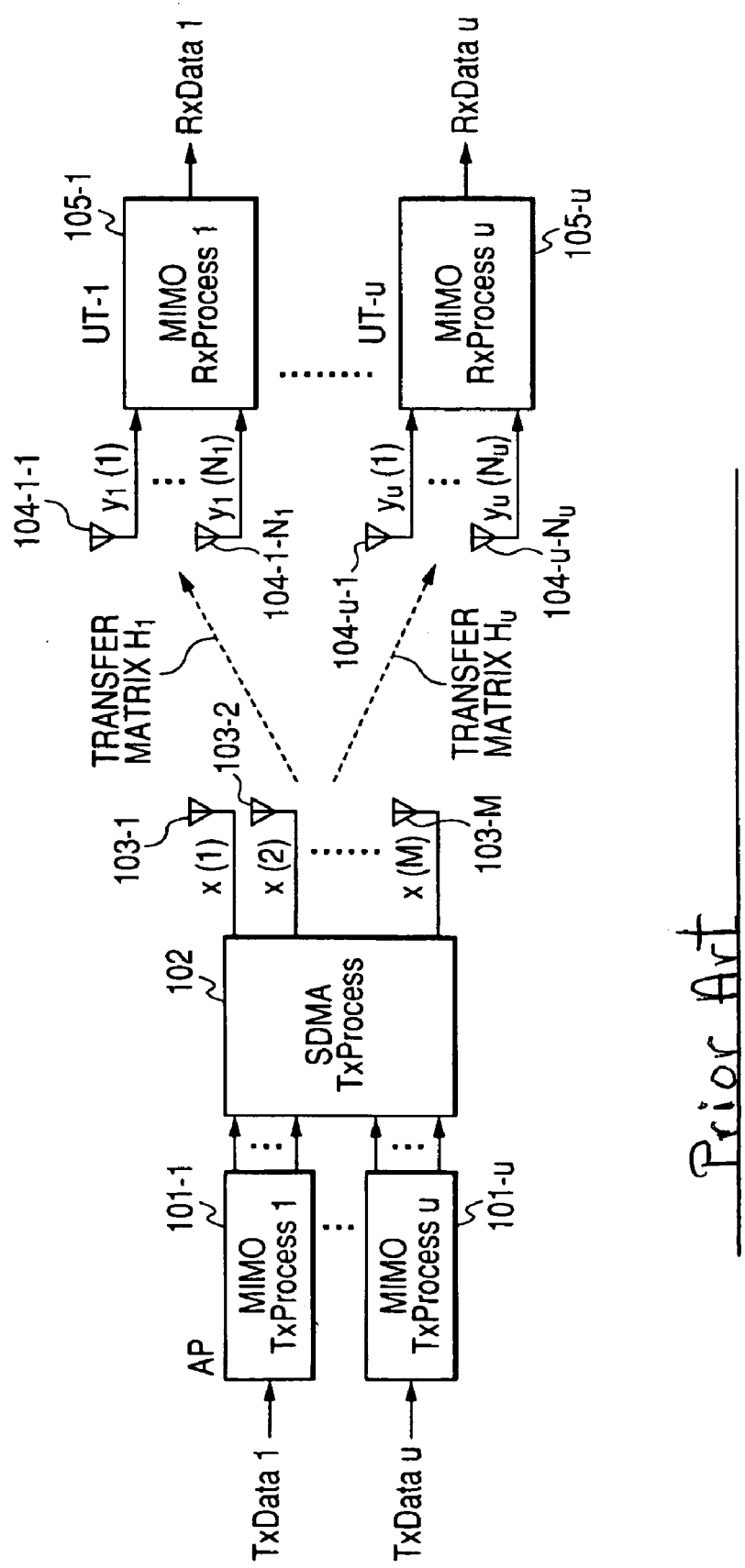
FIG. 1 is a block diagram illustrating the principles of a conventional MIMO-SDMA technology.
Figure 2:
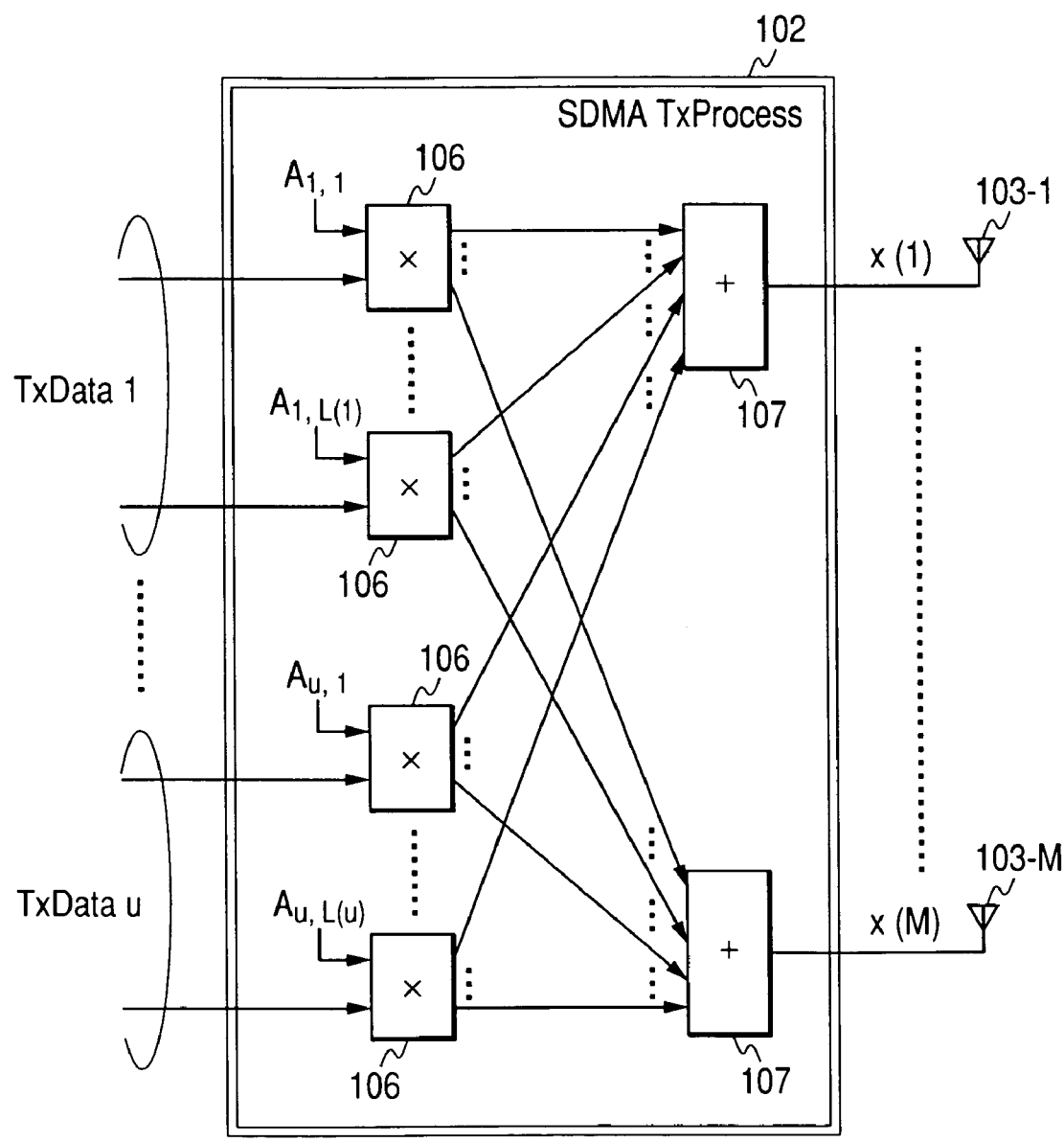
FIG. 2 is a detailed block diagram illustrating an SDMA transmission processor (SDMA TxProcess)

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

First Preferred Embodiment

Figure 3:
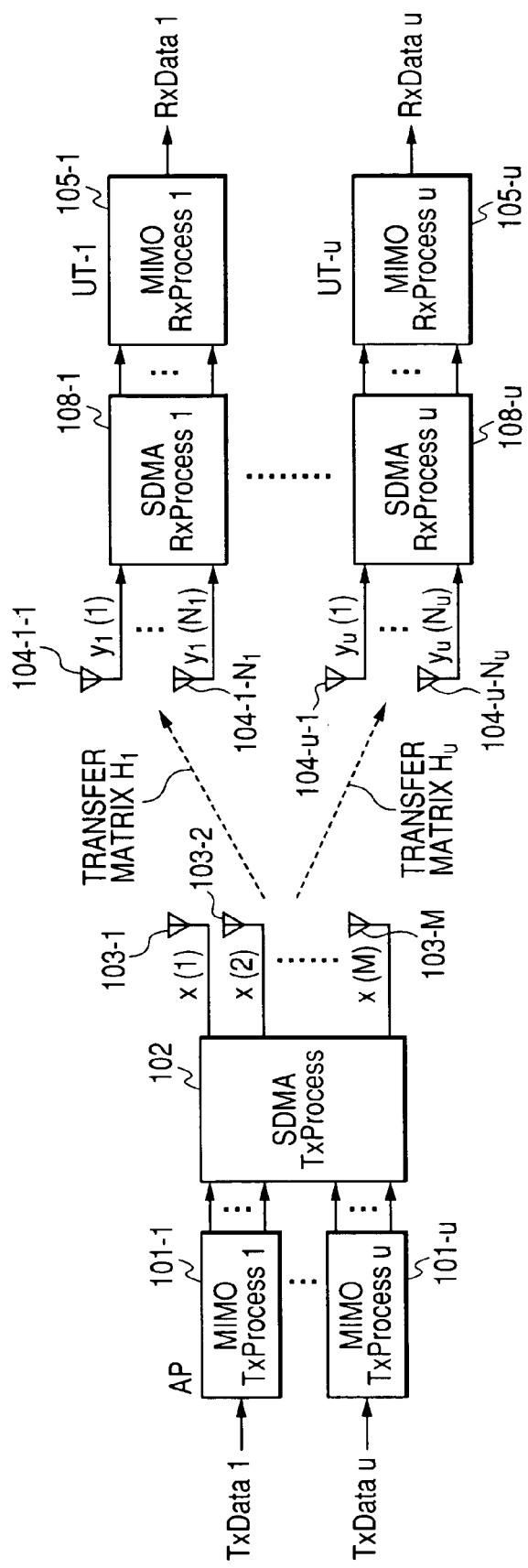
FIG. 3 is a block diagram illustrating a wireless data communication system according to a first preferred embodiment of the present invention.

FIG. 3 is a block diagram illustrating a wireless data communication system according to a first preferred embodiment of the present invention. The wireless data communication system of FIG. 3 is provided to explain the MIMO-SDMA communication according to the present invention, such that the simplified configurations of actual AP and UT are shown in FIG. 3.

Referring to FIG. 3, the wireless data communication system includes the AP and the UT.

The AP includes a MIMO transmission processor (MIMO TxProcess) 101 (101-1 to 101-$u$), an SDMA transmission processor (SDMA TxProcess) 102, and a Tx antenna 103 composed of M Tx antennas (103-1 to 103-M), in association with Tx data (TxData) (1 to u).

The UT includes an Rx antenna 104 (104-1-1 to 104-1-$N_i$, ..., 104-$u$-1 to 104-$u$-$N_u$), an SDMA Rx processor (SDMA RxProcess) 108 (108-1 to 109-$u$), and the MIMO Rx processor 105 (105-1 to 105-$u$), in association with Rx data (RxData) (1 to u).

In FIG. 3, the same or similar elements are denoted by the same reference numerals as FIG. 1 even though they are depicted in different drawings, such that their detailed description will herein be omitted for the convenience of description, and only new elements depicted in FIG. 3 will hereinafter be described in detail.

Specifically, the wireless data communication system according to the first preferred embodiment of the present invention includes a single AP (i.e., transmitter) and a plurality of UTs (i.e., receivers), and controls the single AP to communicate with the UTs using the same frequency wave signals at the same time.

The AP includes a plurality of Tx antennas 103 and an SDMA Tx processor (SDMA TxProcess) 102, etc. The SDMA Tx processor (SDMA TxProcess) 102 multiplies each of signals transmitted to the UTs by a complex coefficient, distributes the multiplied result to the Tx antennas 103, adds the signals distributed to the same Tx antennas 103, and transmits the added result to each Tx antenna 103.

The UT includes at least one Rx antenna 104 and an SDMA Rx processor (SDMA RxProcess) 108. The SDMA Rx processor (SDMA RxProcess) 108 multiplies signals received via the Rx antennas 104 by a complex coefficient, and adds the multiplied result to the received signals, such that it creates signals, the number of which is equal to or less than the number of Rx antennas 104.

In this configuration of FIG. 3, the signal process of the SDMA TxProcess 102, transmission characteristics of space propagation signals, and the signal process of the SDMA RxProcess 108 are mixed or synthesized with each other, such that signals transmitted to UTs other than a desired UT are suppressed.

As can be seen from FIG. 3, the AP is located at the left side, and the UT is located at the right side. A single Ap communicates with u UTs according to the MIMO-SDMA scheme, such that data is transmitted from the AP to the u UTs.

Tx data (1 to u) transmitted to each UT is processed by the MIMO Tx processor (MIMO TxProcess) 101. Thereafter, data is distributed to the Tx antenna 103 composed of M Tx antennas by the SDMA Tx processor (SDMA TxProcess) 102. Output data of the Tx antenna 103 propagates through space.

The UT-i (i=1 to u) receives the output data of the Tx antenna 103 via $N_i$ Rx antennas 104, such that the SDMA Rx processor (SDMA RxProcess) 108 synthesizes the received signals. The MIMO Rx processor (MIMO RxProcess) 105 recovers data, such that it acquires Rx data (1 to u).

The signal transmission characteristic of space propagation between the Tx antenna 103 and the Rx antenna (104-$i$) of the UT-i may be denoted by the transfer matrix $H_i$ denoted by the above-mentioned Equation 1.

In the first preferred embodiment of the present invention, if the condition of the above-mentioned Equation 7 is not provided, the SDMA Rx processor (SDMA RxProcess) 108 performs no process, and the wireless data communication based on the MIMO-SDMA scheme is executed by a general null-steering scheme.

If the condition of the above-mentioned Equation 7 is provided, the number ($N_i$) of Rx antennas is replaced with the number of parallel Rx data units of each UT, such that the number of parallel Rx data units is established to satisfy a predetermined condition denoted by $M=\Sigma N_i$. In this case, it should be noted that the number of parallel Rx data units cannot be higher than the number of original antennas of each UT.

Under the above-mentioned situation, the number of parallel Rx data units of each UT can be freely determined. For example, a large number of parallel Rx data units can be assigned to the UT requiring a high throughput.

Then, a synthetic coefficient matrix ($B_i$) acquired when the Rx signals $(y_i=(y_i(1), \ldots, y_i(N_i))^T$ of the Rx antennas 104 are synthesized by the SDMA Rx processor (SDMA RxProcess) 108 is determined. A Singular Value Decomposition (SVD) of the transfer matrix $H_i$ loaded on Tx data (i) toward the UT-i can be represented by the following Equation 9:

$$H_i = U_i \Sigma_i V_i^H \quad \text{[Equation 9]}$$

where superscript H is indicative of a conjugate transpose, $U_i^H$ is indicative of a synthetic matrix in association with the MIMO Rx process, such that a column vector is denoted by a synthetic coefficient corresponding to a unique mode.

The higher the singular value of the unique mode, the higher the gain and diversity effects, such that the column vectors, the number of which is equal to the number of parallel Rx data units of the UT-i, are sequentially removed from a first column vector of the synthetic matrix $U_i^H$.

Therefore, $B_i$ is a matrix acquired when predetermined data units corresponding to the number of parallel Rx data units are deducted from an upper part of the synthetic matrix $U_i^H$. As a result, a transfer matrix between the Tx antennas 103 of the AP and output terminals of the SDMA Rx processor (SDMA RxProcess) can be represented by $B_i H_i$. If the null-steering scheme is executed by considering the transfer matrix $B_i H_i$ to be a new transfer matrix $H_i$, the SDMA can be implemented such that the number of parallel Tx data units is equal to the maximum number of parallel data units of the MIMO.

Figure 4:
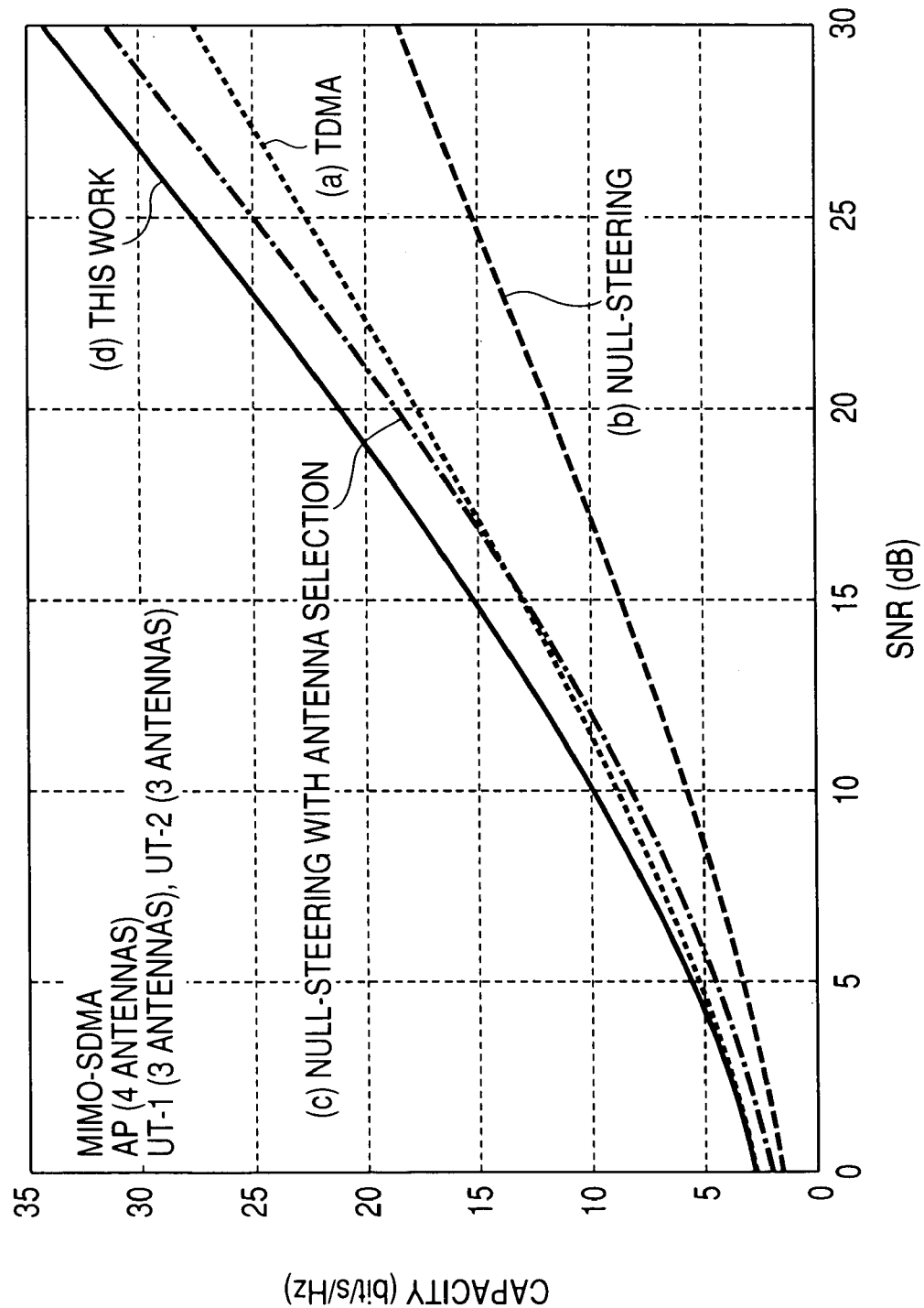
FIG. 4 is a graph illustrating the comparison result between a conventional scheme and the inventive scheme in association with characteristics of a SNR (Signal-to-Noise Ratio) to transmission capacity.

In order to describe the above-mentioned effects in detail, an exemplary case in which the number of AP antennas is 4, the number of UTs is 2, and the number of antennas of each UT is 3 is shown in FIG. 4 illustrating the comparison result of characteristics between an SNR and transmission capacity.

FIG. 4 is a graph illustrating the comparison result between a conventional scheme and the inventive scheme in association with characteristics of a SNR (Signal-to-Noise Ratio) to transmission capacity.

The above-mentioned situation of FIG. 4 satisfies the above-mentioned Equation 5, such that the null-steering scheme is made available. However, the above-mentioned situation of FIG. 4 corresponds to the condition of the above-mentioned Equation 7, such that the number of parallel Tx data units does not reach the maximum value of a MIMO performance (i.e., a MIMO throughput).

As can be seen from FIG. 4, a horizontal axis of the graph is indicative of an SNR configured in the form of dB units, and a vertical axis of the graph is indicative of transmission (Tx) capacity calculated by the Shannon's Capacity Theorem.

In FIG. 4, (a) is capacity of a TDMA (Time Division Multiple Access) alternately communicating with two UTs using a time division method, (b) is capacity of the null-steering case, (c) is capacity of the antenna-selection null-steering case (depicted by "Null-steering with antenna selection" in FIG. 4), and (d) is capacity of the present invention.

The above-mentioned antenna-selection null-steering case and the present invention assume that the number of parallel Tx data units of each UT (UT-1 or UT-2) is set to "2".

The MIMO performance is not maximally elicited in the null-steering case, such that the capacity does not reach the TDMA capacity.

Conventionally, if the SNR value is high in the antenna-selection null-steering scheme, capacity of the antenna-selection null-steering scheme is higher than that of the TDMA scheme. Otherwise, if the SNR value is low in the antenna-selection null-steering scheme, capacity of the antenna-selection null-steering scheme is less than that of the TDMA scheme.

However, compared with the above-mentioned conventional scheme, the inventive scheme according to the present invention can acquire capacity higher than those of other schemes, irrespective of SNR values. In this way, it can be recognized that the inventive scheme according to the present invention acquires transmission characteristics superior to those of the conventional scheme, such that it is superior to the conventional scheme.

As described above, according to the above-mentioned preferred embodiment of the present invention, the MIMO-SDMA scheme is implemented even when the condition of Equation 5 is not satisfied.

Although the condition of Equation 7 is provided, the present invention can effectively use signals received in all Rx antennas, resulting in an increased MIMO-SDMA throughput.

Therefore, the limitation of the number of AP antennas or UT antennas is removed, and the number of parallel-communication data units is set to the maximum value of the MIMO communication, such that MIMO-SDMA wireless data communication system having superior transmission characteristics can be provided.

Second Preferred Embodiment

Figure 5:
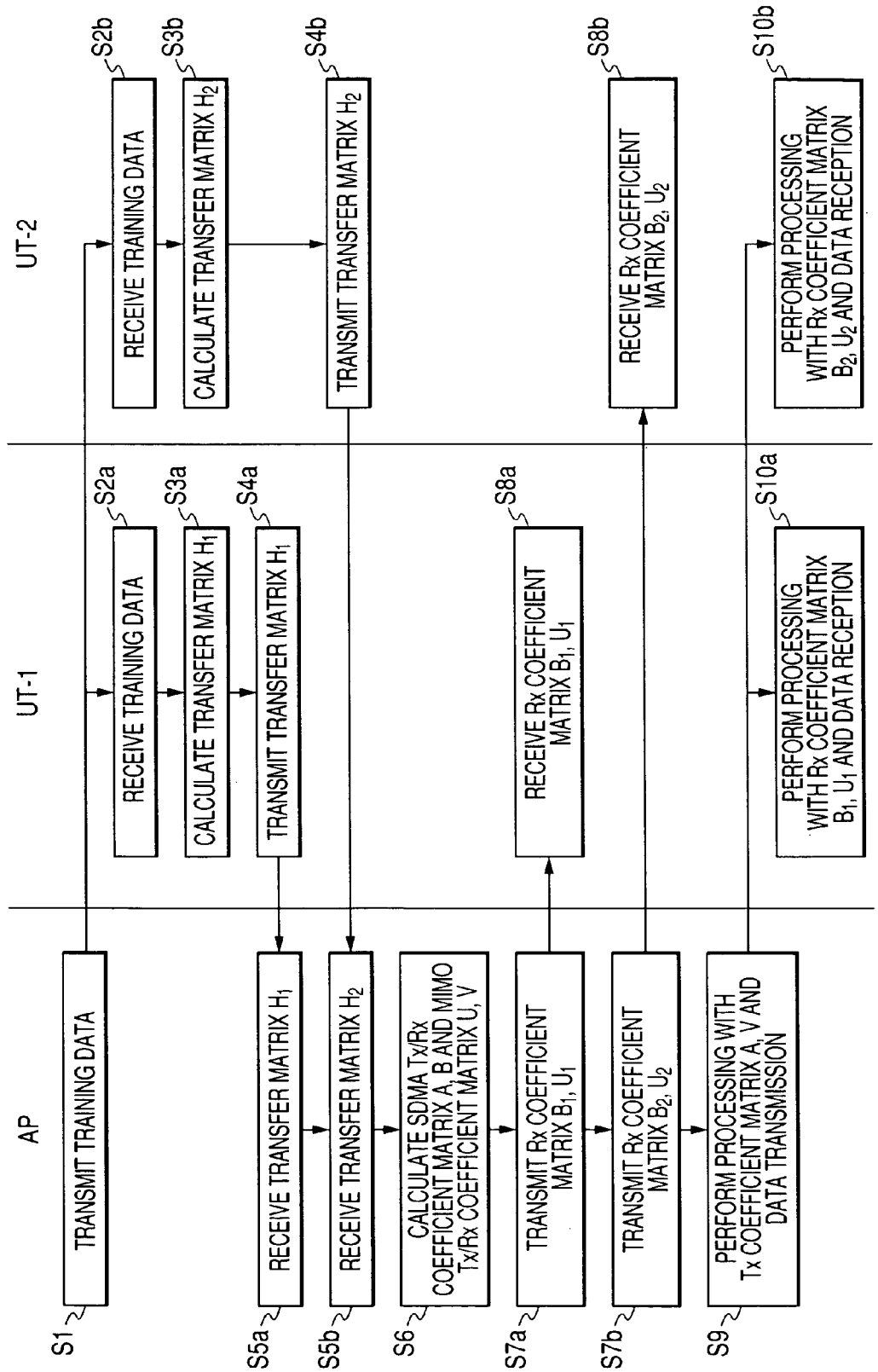
FIG. 5 is a flow chart illustrating a communication sequence of a wireless data communication system according to a second preferred embodiment of the present invention.

FIG. 5 is a flow chart illustrating a communication sequence of a wireless data communication system according to a second preferred embodiment of the present invention.

It should be noted that the wireless data communication system of the second preferred embodiment is the same as in FIG. 1 of the above-mentioned first preferred embodiment. However, although only two UTs are depicted in FIG. 5 for the convenience of description, it should be noted that the concept of FIG. 5 is applicable to not only two UTs but also other UTs irrespective of the number of UTs.

The wireless data communication system according to the second preferred embodiment of the present invention is based on the MIMO technology, such that there is a need to recognize a transfer matrix $H_i(i=1, 2)$ of wave signals. Therefore, training data for observing the transfer matrix is transmitted from the AP to each UT at step S1. The training data is pre-determined, such that each UT can calculate the transfer matrix ($H_i$) using the received training data at steps S2a, S2b, S3a, and S3b.

Then, the transfer matrix ($H_i$) calculated by each UT is fed back to the AP at steps S4a and S4b. The AP receives the fed-back transfer matrix ($H_i$) at steps S5a to S5b, and calculates SDMA Tx/Rx (transmission/reception) coefficient matrices (A, B) and MIMO Tx/Rx coefficient matrices (U, V) at step S6. The calculated Rx coefficient matrices ($B_i$, $U_i$) are transmitted to each UT at steps S7a to S7b. Each UT receives the Rx coefficient matrices ($B_i$, $U_i$) at steps S8a to S8b.

Then, the AP processes the MIMO Tx coefficient and the SDMA Tx coefficient using the Tx coefficient matrix (B, U), and outputs the processed result at step S9. Each UT performs processing using the received Rx coefficient matrix ($B_i$, $U_i$), resulting in the implementation of data recovery.

In this case, the above-mentioned second preferred embodiment of the present invention must transmit the SDMA Rx coefficient matrix to the UT, differently from the conventional art. The UT can estimate the MIMO Rx coefficient matrix on the basis of a periodically-transmitted training signal, such that there is no need for the AP to inform the UT of the MIMO Rx coefficient matrix.

As described above, according to the above-mentioned second preferred embodiment of the present invention, the SDMA Rx coefficient matrix is transmitted to each UT, such that the same effect as the first preferred embodiment is acquired.

Third Preferred Embodiment

Figure 6:
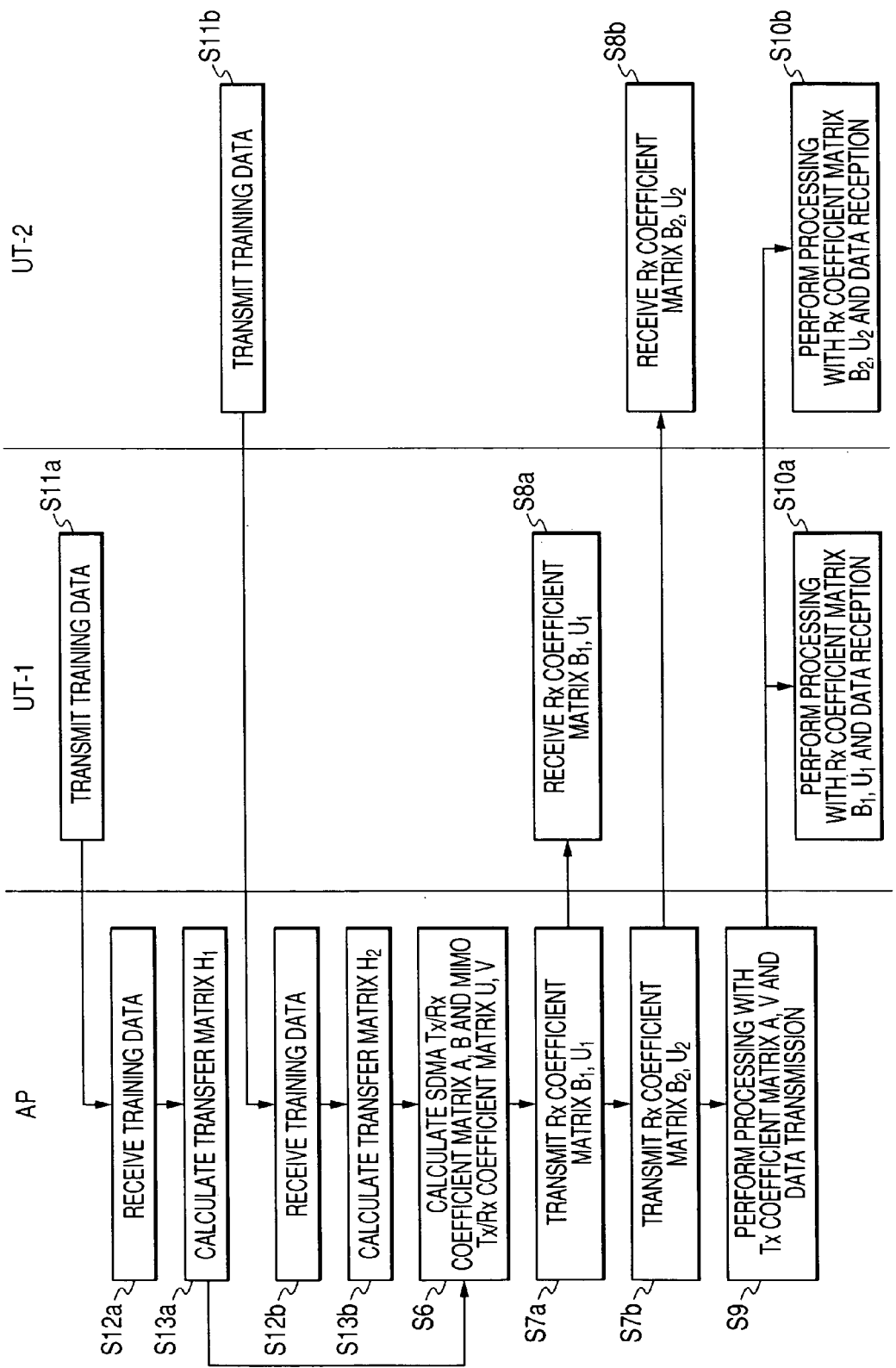
FIG. 6 is a flow chart illustrating a communication sequence of a wireless data communication system according to a third preferred embodiment of the present invention.

FIG. 6 is a flow chart illustrating a communication sequence of a wireless data communication system according to a third preferred embodiment of the present invention. Although most parts of FIG. 6 are equal to those of FIG. 5, it should be noted that a method for calculating the transfer matrix ($H_i$) in FIG. 6 is different from that of FIG. 5.

Generally, the signal transmission characteristics from the AP to one UT are equal to the signal transmission characteristics from the UT to the AP. Therefore, although the signal is transmitted from the AP to the UT, the Tx/Rx coefficient matrices can be calculated by the signal transmission characteristics from the UT to the AP, such that there is no problem in calculating the Tx/Rx coefficient matrices.

Therefore, training data is transmitted from each UT at steps S11a to S11b, as shown in FIG. 6. The AP receives the training data at steps S12a to S12b, and calculates the transfer matrix ($H_i$) using the received training data at steps S13a to S13b.

The SDMA Rx coefficient matrix must be transmitted to the UTs as shown in FIG. 6, differently from the conventional art.

As described above, according to the third preferred embodiment of the present invention, the Tx/Rx coefficient matrices are calculated by the transfer matrix of signals from the UTs to the AP, the SDMA Rx coefficient matrix is transmitted to the UTs, such that the same effect as the first preferred embodiment is acquired.

Fourth Preferred Embodiment

Figure 7:
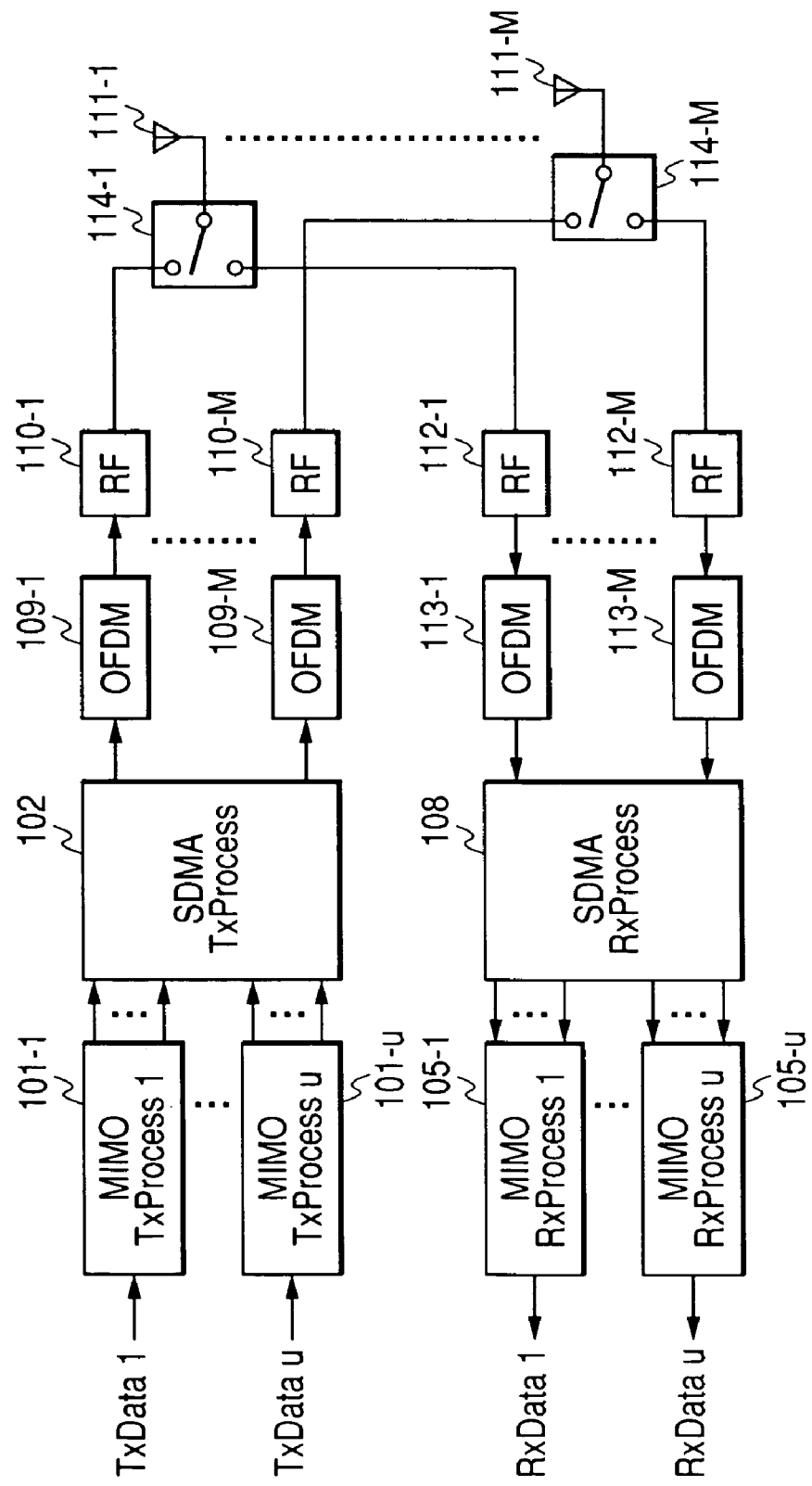
FIG. 7 is a block diagram illustrating a transceiving unit acting as a wireless data communication system according to a fourth preferred embodiment of the present invention.

FIG. 7 is a block diagram illustrating a transceiving unit acting as a wireless data communication system according to a fourth preferred embodiment of the present invention.

Referring to FIG. 7, in association with Tx data (TxData) (1 to u), the transceiving unit acting as the wireless data communication system according to the fourth preferred embodiment of the present invention includes at least one MIMO Tx processor (MIMO TxProcess) 101 (101-1 to 101-$u$), an SDMA Tx processor (SDMA TxProcess) 102, at least one OFDM (Orthogonal Frequency Division Multiplex) transmission converter 109 (109-1 to 109-M), and at least one transmission RF unit 110 (110-1 to 110-M).

In association with Rx data (1 to u), the above-mentioned transceiving unit includes at least one reception RF unit 112 (112-1 to 112-M), at least one OFDM reception converter 113 (113-1 to 113-M), an SDMA Rx processor (SDMA RxProcess) 108, and at least one MIMO Rx processor (MIMO RxProcess) 105 (105-1 to 105-$u$).

Furthermore, for both the transmission and the reception of signals, the above-mentioned transceiving unit further includes at least one transceiving antenna 111 (111-1 to 111-M) and at least one switch 114 (114-1 to 114-M).

In FIG. 7, the same or similar elements are denoted by the same reference numerals as FIG. 3 even though they are depicted in different drawings, such that their detailed description will herein be omitted for the convenience of description, and only new elements depicted in FIG. 3 will hereinafter be described in detail.

Tx data is processed by the MIMO Tx processor (MIMO TxProcess) 101 and the SDMA Tx processor (SDMA TxProcess) 102, and the processed result is transmitted to the OFDM transmission converter 109. The OFDM transmission converter 109 converts the received signals arranged in a frequency axis into other signals arranged in a time axis.

The above-mentioned fourth preferred embodiment of the present invention is not limited to the OFDM communication scheme, and can also be applied to other communication schemes as necessary. Typically, the MIMO technology combined with the OFDM communication scheme is being widely used because the MIMO technology is very suitable for the OFDM communication scheme, such that only the OFDM processor is depicted in FIG. 7 for illustrative purposes.

Then, the signal is received in the transmission RF unit 110, and the transmission RF unit 110 performs frequency-up conversion, power-amplification, and filtering process on the received signal, such that the resultant signal of the transmission RF unit 110 is generated from the transceiving antenna 111 via the switch 114.

In this case, the antenna 111 is designed for both the transmission and the reception of signals, such that the switch 114 is switched to the transmission or reception mode by the antenna 111.

A signal received in the transceiving antenna 111 is applied to the reception RF unit 112 via the switch 114. The reception RF unit 112 performs frequency-down conversion, power-amplification, and filtering process on the received signal.

The OFDM reception converter 113 converts signals arranged in a time axis into other signals arranged in a frequency axis. Thereafter, the output signals of the OFDM reception converter 113 is processed by the SDMA Rx processor (SDMA RxProcess) 108 and the MIMO Rx processor (MIMO RxProcess) 105, resulting in the implementation of data recovery.

The above-mentioned fourth preferred embodiment of the present invention requires the SDMA Rx processor (SDMA RxProcess) 108 in the processing system of Rx signal, differently from the conventional art.

As described above, the transceiving unit acting as the wireless data communication system according to the above-mentioned fourth preferred embodiment of the present invention includes the SDMA Rx processor (SDMA RxProcess) 108 in the Rx-signal processing system, such that it acquires the same effect as the first preferred embodiment.

Fifth Preferred Embodiment

Figure 8:
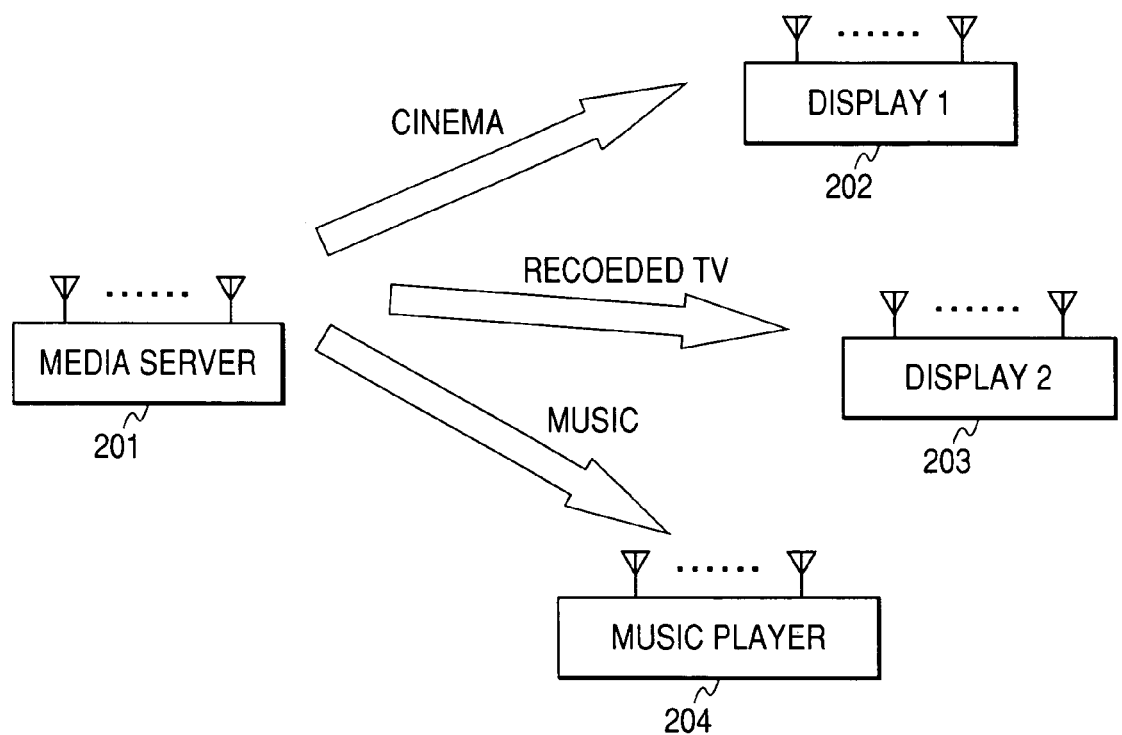
FIG. 8 is a conceptual diagram illustrating a preferred application for use in a wireless data communication system according to a fifth preferred embodiment of the present invention.

FIG. 8 is a conceptual diagram illustrating a preferred application for use in a wireless data communication system according to a fifth preferred embodiment of the present invention.

The present invention is preferable for a wireless data communication system between Personal Computers, and is also preferable for a household multimedia data communication system.

The system according to the above-mentioned fifth preferred embodiment includes a media server 201 as shown in FIG. 8, such that the media server 201 accumulates all the multimedia data. The system according to the fifth preferred embodiment transmits multimedia data to individual UTs upon receiving requests from the UTs (e.g., a first display 202, a second display 203, and a music player 204, etc.)

The above-mentioned application of FIG. 8 can easily consider that data requests are simultaneously generated from different sections or rooms.

For example, a request for movie data (i.e., a movie-data request) may occur to view the movie data on the display 202 of a bedroom, and at the same time a request for pre-recorded TV program data may occur to view the TV program data on the other display 203 of a living room. Also, under the same situation as the aforementioned, a request of music data may also be generated from the music player of a child's room.

In this case, a method for simultaneously transmitting data to individual UTs according to the SDMA communication scheme is superior to a method for sequentially transmitting data to individual UTs according to the TDMA communication scheme, because the former method can implement a higher throughput than that of the latter method.

Also, the system according to the fifth preferred embodiment of the present invention can control each UT to freely change the number of parallel-transmission data units, such that it can firstly assign the number of parallel-transmission data units to a specific UT conducting higher-importance communication.

As described above, although the system according to the fifth preferred embodiment of the present invention is applied to the household multimedia data communication system, the system can acquire the same effect as the first preferred embodiment.

As apparent from the above description, the present invention provides a wireless data communication system based on a Space Division Multiple Access (SDMA), a wireless data communication method based on the SDMA, and effective techniques associated with the system and method.

The present invention is applicable to all the wireless data communication systems. Particularly, the present invention is preferably applied to an OFDM-based wireless data communication system.

The OFDM technology is being widely applied to the wireless LAN, and the IEEE 802.11n standard will certainly adopt the MIMO technology in the future, such that the MIMO-SDMA communication scheme of the present invention is very suitable for the wireless LAN and the IEEE 802.11n standard.

The above-mentioned SDMA communication scheme acquires the best throughput when the AP simultaneously communicates with a plurality of UTs.

For example, provided that the media server is located at home, and users of several rooms desire to access the media server to view desired moving images, the media server can simultaneously provide the users with their desired data using the SDMA communication scheme. In this way, if the simultaneous communication function is required for the above-mentioned situation, the wireless data communication system according to the present invention can easily implement the simultaneous communication function according to the MIMO-SDMA communication scheme.

As described above, the present invention has no limitation in the number of AP antennas and UT antennas, and determines the parallel-communication data units to be a maximum value of MIMO communication, such that it provides a MIMO-SDMA wireless data communication system having superior transmission characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless data communication system comprising:
a single transmitter; and
a plurality of receivers for communicating with the single transmitter using the same frequency signal at the same time,
wherein the transmitter includes:
a plurality of transmission (Tx) antennas; and
a Space Division Multiple Access (SDMA) transmission (Tx) processor for multiplying each of signals transmitted to the receivers by a complex coefficient, distributing the multiplied result to the Tx antennas, adding the signals distributed to the same Tx antennas, and transmitting the added result to each Tx antenna,
wherein each of the receivers includes:
at least one reception (Rx) antenna; and
an SDMA reception (Rx) processor for multiplying signals received via the Rx antennas by a complex coefficient, adding the multiplied result to the received signals, and creating specific signals equal to or less than the number of Rx antennas, and
wherein an SDMA-control signal process of the SDMA Tx processor, transmission characteristics of space propagation signals, an SDMA-control signal process of the SDMA Rx processor are synthesized with each other, such that signals transmitted to the remaining receivers other than a desired receiver are suppressed.

2. The wireless data communication system according to claim 1,
wherein the SDMA Rx processor calculates a Singular Value Decomposition (SVD) $H=U\Sigma V^H$ (where superscript H is a conjugate transpose) of a signal transfer matrix (H) between the transmitter and the remaining receivers, and determines the complex coefficient using the calculated SVD, such that the complex coefficient acts as a complex coefficient for use in the SDMA Rx processor by a column vector of a synthetic matrix $U^H$.

3. The wireless data communication system according to claim 2,
wherein the transmitter, if the number of the transmitter's antennas is higher than the number of the receivers' antennas, simultaneously parallel-transmits different data units, the number of which is equal to the number of the transmitter's antennas.

4. The wireless data communication system according to claim 3,
wherein the number of parallel-transmission data units applied to the receivers is changed according to requests of the receivers.

5. A wireless data communication method for use in a wireless data communication system, which includes:
a single transmitter; and
a plurality of receivers for communicating with the single transmitter using the same frequency signal at the same time,
wherein the transmitter includes:
a plurality of transmission (Tx) antennas; and
a Space Division Multiple Access (SDMA) transmission (Tx) processor for multiplying each of signals transmitted to the receivers by a complex coefficient, distributing the multiplied result to the Tx antennas, adding the signals distributed to the same Tx antennas, and transmitting the added result to each Tx antenna, and
wherein each of the receivers includes: at least one reception (Rx) antenna; and an SDMA reception (Rx) processor for multiplying signals received via the Rx antennas by a complex coefficient, adding the multiplied result to the received signals, and creating specific signals equal to or less than the number of Rx antennas,
the wireless data communication method comprising the steps of:
estimating a transfer matrix of signals between the transmitter and the receivers by a training signal transmitted from either the transmitter or the receivers;
determining, by the transmitter, the number of parallel transmission data units simultaneously applied to the receivers, and the complex coefficient of the SDMA Rx processor;
determining, by the transmitter, the complex coefficient of the SDMA Tx processor;
transmitting, by the transmitter, the complex coefficient of the SDMA Rx processor to the receivers, and informing the receivers of the complex coefficient of the SDMA Rx processor;
outputting, by the transmitter, transmission (Tx) signals processed by the SDMA Tx processor; and
controlling, by the receivers, signals received in Rx antennas to be signal-processed by the SDMA Rx processor,
wherein the communication between the transmitter and the receivers is established.

6. A communication apparatus composed of a plurality of communication units to communicate with a single transmitter using the same frequency signal at the same time, the communication apparatus comprising:
at least one reception (Rx) antenna; and
a Space Division Multiple Access (SDMA) reception (Rx) processor for multiplying signals received via the Rx antennas by a complex coefficient, adding the multiplied result to the received signals, and creating specific signals equal to or less than the number of Rx antennas,
wherein an SDMA-control signal process of the transmitter, transmission characteristics of space propagation signals, and an SDMA-control signal process of the SDMA Rx processor are synthesized with each other, such that signals transmitted to the remaining communication units other than a desired communication unit are suppressed.

7. The communication apparatus according to claim 6, further comprising:
a plurality of transmission (Tx) antennas; and
a Space Division Multiple Access (SDMA) transmission (Tx) processor for multiplying each of signals transmitted to the communication units (i.e., receivers) by a complex coefficient, distributing the multiplied result to the Tx antennas, adding the signals distributed to the same Tx antennas, and transmitting the added result to each Tx antenna.

* * * * *